(12) United States Patent
Liu et al.

(10) Patent No.: US 9,692,890 B2
(45) Date of Patent: Jun. 27, 2017

(54) CALL TRANSFER SETTING METHOD AND SYSTEM

(71) Applicant: ZTE CORPORATION, Shenzhen, Guangdong Province (CN)

(72) Inventors: Tao Liu, Shenzhen (CN); Xin Yang, Shenzhen (CN)

(73) Assignee: ZTE CORPORATION (CN)

(*) Notice: Subject to any disclaimer, the term of this patent is extended or adjusted under 35 U.S.C. 154(b) by 0 days.

(21) Appl. No.: 14/763,988

(22) PCT Filed: Jul. 9, 2013

(86) PCT No.: PCT/CN2013/079034
§ 371 (c)(1),
(2) Date: Jul. 28, 2015

(87) PCT Pub. No.: WO2013/182113
PCT Pub. Date: Dec. 12, 2013

(65) Prior Publication Data
US 2015/0365525 A1 Dec. 17, 2015

(30) Foreign Application Priority Data
Jan. 29, 2013 (CN) .......................... 2013 1 0033189

(51) Int. Cl.
*H04M 3/42* (2006.01)
*H04W 4/16* (2009.01)
(Continued)

(52) U.S. Cl.
CPC ....... *H04M 3/42263* (2013.01); *H04M 3/548* (2013.01); *H04W 4/16* (2013.01); *H04W 12/06* (2013.01)

(58) Field of Classification Search
CPC .. H04M 2242/04; H04M 3/02; H04M 3/4281; H04M 3/53308; H04M 7/0009;
(Continued)

(56) References Cited

U.S. PATENT DOCUMENTS 6,253,088 B1* 6/2001 Wenk ................. H04M 1/725
455/417
2002/0068575 A1* 6/2002 Agrawal ............... H04M 3/54
455/445
(Continued)

FOREIGN PATENT DOCUMENTS

CN 101489203 A * 2/2009
CN 101448229 A 6/2009
(Continued)

OTHER PUBLICATIONS

European Search Report issued Dec. 8, 2015 in European Patent Application No. EP 13800734.9.

*Primary Examiner* — Nizar Sivji
(74) *Attorney, Agent, or Firm* — Plumsea Law Group, LLC

(57) ABSTRACT

Disclosed is a call transfer setting method, terminal and system, wherein the method includes: two terminals pre-establishing a pairing relationship via a network side; when one of the terminals enables a call transfer function according to a demand of the other terminal paired therewith, the terminal initiating an enabling call transfer request to the network side; the network side searching for the other terminal paired therewith according to the enabling call transfer request of the terminal, and enabling the call transfer function of the other terminal to transfer all calls of the other terminal to the terminal; compared with the conventional call transfer function, the implementation of the abovementioned technical solution is more flexible, and the function can be remotely enabled after the paired terminal is set, (Continued)

without being affected by situations such as whether the phone currently has a signal or not or whether the phone is powered on.

16 Claims, 2 Drawing Sheets

(51) Int. Cl.
*H04M 3/54* (2006.01)
*H04W 12/06* (2009.01)

(58) Field of Classification Search
CPC ............. H04M 15/7652; H04M 1/006; H04M 2215/42; H04M 2215/745; H04M 3/4288; H04M 3/42263; H04L 65/1096; H04L 51/14; H04L 12/66; H04L 25/49; H04L 63/0414; H04L 2209/80; H04L 9/0844; H04L 9/3226; H04L 9/3247; H04Q 2213/13282; H04W 8/20; H04W 72/1263; H04W 12/06; H04W 4/16; G06Q 20/32; H04N 7/15; G06F 21/606; H04B 3/54
See application file for complete search history.

(56) References Cited

U.S. PATENT DOCUMENTS

| | | | |
|---|---|---|---|
| 2006/0223511 A1* | 10/2006 | Hagale | H04M 3/54 455/417 |
| 2014/0087705 A1* | 3/2014 | Wooster | H04B 5/0031 455/416 |
| 2014/0169546 A1* | 6/2014 | Chen | H04M 3/54 379/212.01 |

FOREIGN PATENT DOCUMENTS

| | | |
|---|---|---|
| CN | 101489203 A | 7/2009 |
| CN | 102404705 A | 4/2012 |

* cited by examiner

CALL TRANSFER SETTING METHOD AND SYSTEM

CROSS-REFERENCE TO RELATED APPLICATION(S)

This application is the U.S. National Phase application of PCT application number PCT/CN2013/079034 having a PCT filing date of Jul. 9, 2013, which claims priority of Chinese patent application 201310033189.X filed on Jan. 29, 2013, the disclosures of which are hereby incorporated by reference.

TECHNICAL FIELD

The present document relates to the call transfer setting technology, and more particularly, to a call transfer setting method and system.

BACKGROUND OF THE RELATED ART

Mobile terminals (such as mobile phones, tablet PCs) are developing rapidly and applied universally, and they have become an everyday essential communication tool, but there are also specific requirements on timely processing calls and SMS, for example, many users always miss important calls or text messages because they forget to bring their phones or their phones are out of batteries, which at least brings inconvenience to life, and worst of all, the users may miss important business, emergency calls and so on.

The call transfer technology brings solutions to this situation, and to a certain extent, it can reduce missing calls. There are two traditional methods for setting and enabling the call transfer function:

the first method is setting in the local machine in advance and notifying the network side, and incoming calls are forwarded to a preset number when meeting the specific call transfer condition, but this method cannot enable the call transfer function in order not to miss important calls in the case that a user forgets to bring the mobile phone.

The other method is setting through an online business hall, and the call transfer function can be set after logging in. This method has requirements on network environments and also has limitations. Therefore traditionally, users cannot set and enable the business without the abovementioned objective conditions.

SUMMARY OF THE INVENTION

In view of the abovementioned analysis, the present document is aiming to provide a call transfer setting method and system, to solve the problem brought by the user forgetting to bring the user's mobile phone or by network environment limitations in the related call transfer technology.

To solve the abovementioned technical problem, the following technical solution is used:

a call transfer setting method comprises:

a first terminal and a second terminal pre-establishing a pairing relationship through a network side;

when the first terminal enables a call transfer function according to a demand of the second terminal paired therewith, the first terminal initiating an enabling call transfer request to the network side;

the network side searching for the second terminal paired with the first terminal according to the enabling call transfer request of the first terminal, enabling a call transfer function of the second terminal, and transferring all calls of the second terminal to the first terminal.

Alternatively, when the first terminal disables the call transfer according to a demand of the second terminal paired therewith, the first terminal initiates a disabling call transfer request to the network side; the network side disables the call transfer function of the second terminal according to the disabling call transfer request.

Alternatively, the step of a first terminal and a second terminal pre-establishing a pairing relationship through a network side comprises:

after the first terminal initiates a matching request to the second terminal which the first terminal intends to be paired with and is successfully authenticated with the second terminal, the first terminal and the second terminal respectively requesting the network side to establish a pairing relationship with a peer party, after the network side successfully pairs the first terminal and the second terminal, it establishing a pairing relationship of the two terminals.

Alternatively, the first terminal carries an authentication password at the same time of sending the matching request to the second terminal which the first terminal intends to be paired with, and if the second terminal agrees to establish a pairing relationship, it replies an authentication password to the first terminal, when the first terminal matches the received authentication password with the authentication password sent by itself and the matching is confirmed to be successful, the first terminal is successfully authenticated with the first terminal which the first terminal intends to be paired with.

Alternatively, after the first terminal is successfully authenticated with the second terminal which the first terminal intends to be paired with, the first terminal and the second terminal respectively report their pairing information and authentication passwords to the network side, and request the network side to establish a pairing relationship with a peer party; the network side matches the matching information and the authentication passwords received from the two terminals in order, and establishes a matching relationship of the two terminals after all the matchings are successful while saving the matching information and the authentication passwords.

Alternatively, if the first terminal carries the authentication password at the same time of initiating a call transfer request to the network side, after the network side searches out the second terminal which is paired with the first terminal according to previously stored matching information, it matches the authentication password in the transfer request with the previously stored authentication password, and after determining that the matching is successful, enables the call transfer function of the second terminal, and transfers all calls of the second terminal to the first terminal.

Alternatively, the matching information comprises at least information of the second terminal which is paired with the first terminal.

Alternatively, the first terminal and the second terminal pre-establish a pairing relationship through the network side in a wireless way.

A call transfer setting system, comprising a first terminal, a second terminal and a network side, the first terminal and the second terminal pre-establish a pairing relationship through the network side, wherein:

the first terminal is configured to: enable a call transfer function according to a demand of the second terminal paired therewith, and initiate an enabling call transfer request to the network side;

the network side is configured to: search for the second terminal which is paired with the first terminal according to the enabling call transfer request of the first terminal, enable a call transfer function of the second terminal, and transfer all calls of the second terminal to the first terminal.

Alternatively, the first terminal is further configured to: when disabling the call transfer according to a demand of the second terminal paired therewith, initiate a disabling call transfer request to the network side, and request the network side to disable the call transfer function of the second terminal.

A terminal, which comprises: a pairing module and a call transfer module, wherein:

the pairing module is configured to: establish a pairing relationship with a second terminal via a network side;

the call transfer module is configured to: when enabling a call transfer function according to a demand of the second terminal paired therewith, initiate an enabling call transfer request to the network side, and according to information, returned by the network side, of the second terminal which is paired with the terminal, enable a call transfer function of the second terminal, and transfer all calls of the second terminal to the terminal.

Compared with the conventional call transfer function, the implementation of the abovementioned technical solution is more flexible, and the call transfer function can be remotely enabled after setting the paired terminals, and it is not affected by situations such as whether currently the phone has a signal or not or whether the phone is powered on or not, which gives users great convenience and allows the users to use the function under specific conditions, thus avoiding situations of missing important calls and short messages, and so on.

PREFERRED EMBODIMENTS OF THE INVENTION

Hereinafter, in conjunction with the accompanying drawings, the preferred embodiments of the present invention will be described in detail, wherein, the accompanying drawings constitute into a part of the present application, and together with the embodiments of the present invention, serve to explain the principle of the present document. It should be understood that, the specific embodiments described herein are only used to explain rather than limit the present document.

First, in conjunction with FIG. 1 and FIG. 2, the method according to the embodiment of the present invention will be described in detail.

Figure 1:
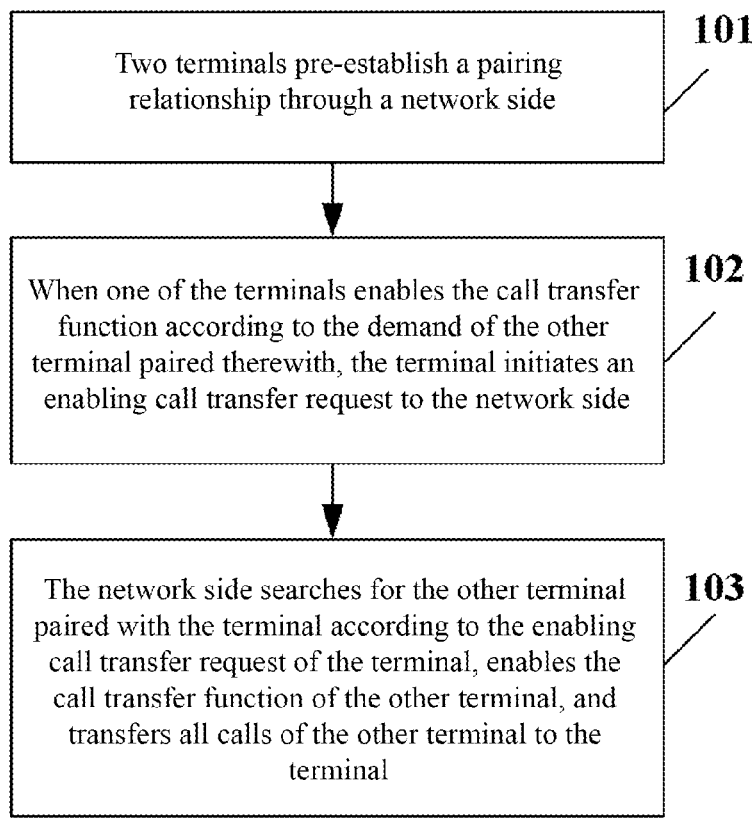
FIG. 1 is a schematic diagram of the process of a first method in accordance with an embodiment of the present invention.

The first method of the embodiment:

As shown in FIG. 1, FIG. 1 is a schematic diagram of the process of the first method in accordance with an embodiment of the present invention, and the method may comprise the following steps:

in step 101: two terminals pre-established a pairing relationship through a network side;

in step 102: when one of the terminals enables the call transfer function according to the demand of the other terminal paired therewith, the terminal initiates an enabling call transfer request to the network side;

in step 103: the network side searches for the other terminal paired with the terminal according to the enabling call transfer request of the terminal, enables the call transfer function of the terminal and transfers all calls of the other terminal to the terminal.

Figure 2:
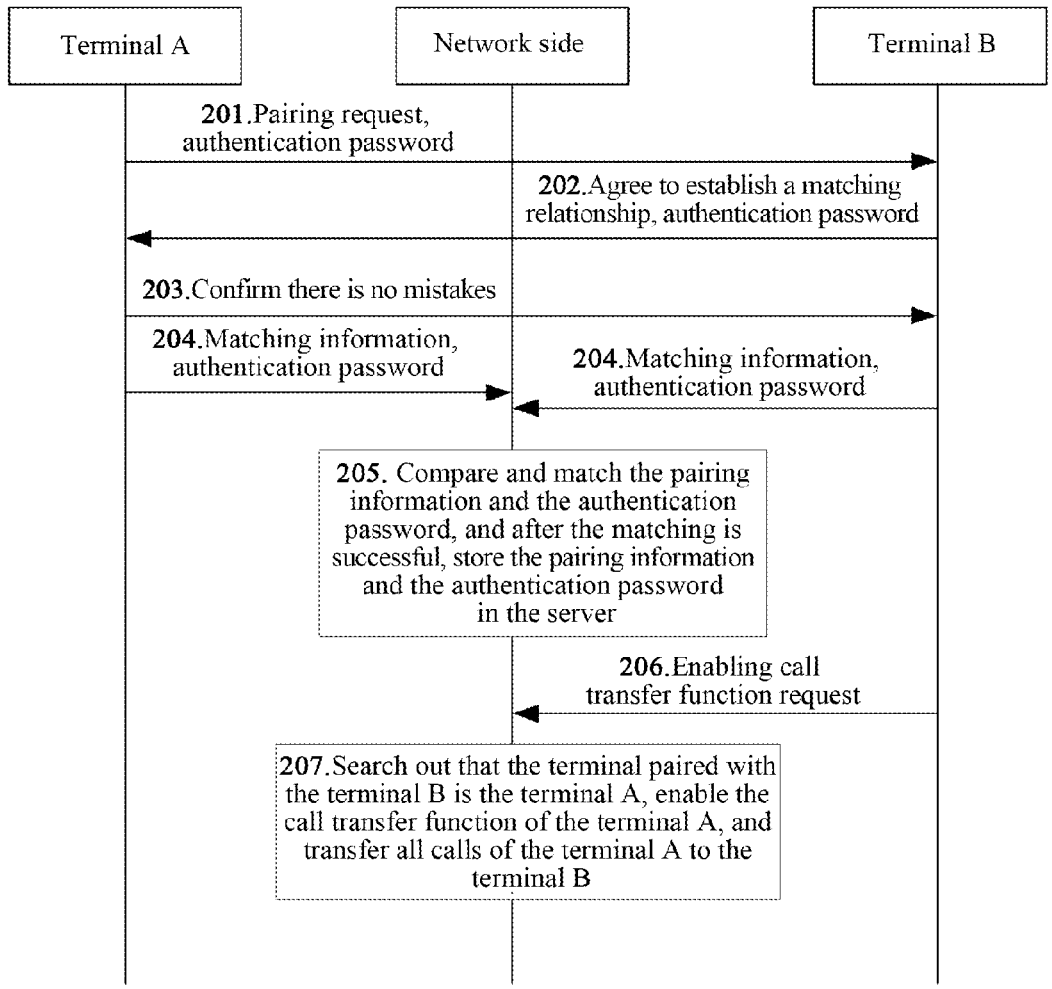
FIG. 2 is a schematic diagram of the process of a second method in accordance with an embodiment of the present invention.

The second method of the embodiment:

As shown in FIG. 2, FIG. 2 is a schematic diagram of the process of the second method according to the embodiment of the present invention, and the method may comprise the following steps:

in step 201: one of the two terminals (such as terminal A) initiates a matching request to the other terminal (such as terminal B) which it intends to be matched with, and carries an authentication password in the matching request;

in step 202: the terminal B performs a confirmation after receiving the matching request, if it does not agree, the terminal B replies the corresponding rejection information to the terminal A; if it agrees to establish a pairing relationship, it replies with information of agreeing to establish a pairing relationship, and it also carries an authentication password in the information and sends it to the terminal A;

in step 203: after receiving the information of agreeing to establish a pairing relationship sent by the terminal B, the terminal A compares the authentication password sent by the terminal B with the previously sent authentication password, and after confirming that there is no mistakes, it executes the step 204, meanwhile, it sends the confirmed correct information to the terminal B, and after receiving the message, the terminal B also executes the step 204;

in step 204: the terminal A or the terminal B report the pairing information along with the authentication password to the network side, such as an operator server;

in step 205: the network side matches the pairing information reported by the two terminals, and saves the pairing information and the authentication password after the matching is successful; wherein, the pairing information at least comprises information of the other terminal which establishes a matching relationship with the present terminal, for example, the pairing information reported by the terminal A records that the call transfer number of the present terminal is the terminal B, similarly, the pairing information reported by the terminal B records that the call transfer number of the present terminal is the terminal A, and the pairing information reported by the two terminals is mutual, meanwhile during the search, each terminal can take its own number as the keyword to search out the number of the other terminal paired therewith.

The above is the process of two terminals establishing a matching relationship, and the process is initiated by one terminal, and the pairing relationship of call transfer is established in the wireless way (including but not limited to the BT/WIFI/NFC), but in this case, the call transfer function is not enabled, and the user only presets the call transfer in advance, and after one terminal enables the call transfer function, all the calls (including calls and text messages and so on) are actually transferred according to the call transfer number.

In step 206: one terminal initiates an enabling call transfer function request including an authentication password; for example, the user of the terminal A left the terminal A at home, and the user notifies the terminal B to enable the call transfer function, and the terminal B sends an enabling call transfer function request;

in step 207: the network side receives the enabling call transfer function request sent by the terminal B, and from the saved pairing information of the terminal B, it searches out that the terminal paired therewith is the terminal A, and after successfully authenticating the authentication password of the terminal B, the network side enables the call transfer function of the terminal paired therewith, and transfers all incoming calls and messages of the terminal A to the terminal B.

In the above, the second method according to the embodiment of the present invention works as a preferred embodiment of the present invention, and an authentication password is set when a terminal interacts with a terminal and a terminal interacts with a network side, which is mainly considered from a security perspective, but those skilled in the art should know that the implementation of the embodiment of the present invention is not necessarily dependent on the authentication password, that is, setting the authentication password belongs to alternative technical means of the embodiment of the present invention.

In the following, the system embodiment of the present invention will be described in detail with reference to the accompanying figures.

Figure 3:
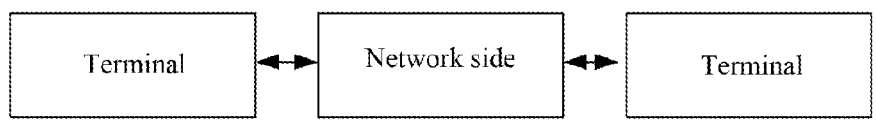
FIG. 3 is a schematic diagram of a system structure in accordance with an embodiment of the present invention.

As shown in FIG. 3, FIG. 3 is a schematic diagram of the structure of a system embodiment of the present invention, which specifically comprises: a network side, and two terminals which establish a pairing relationship via the network side, when one of the terminals enables the call transfer function according to the demand of the other terminal paired therewith, the terminal is used to initiate an enabling call transfer request to the network side; the network side searches for the other terminal paired with the terminal according to the enabling call transfer request of the terminal, and enables the call transfer function of the other terminal, and all calls of the other terminal will be transferred to the terminal; when the terminal disables the call transfer function according to the demand of the other terminal paired therewith, the terminal sends a disabling call transfer request to the network side and requests the network side to disable the call transfer function of the other terminal, the network side disables the call transfer function of the other terminal according to the disabling call transfer request.

As a preferred system embodiment of the present invention, when one of the terminals initiates a pairing request to the other terminal which it intends to be paired with and is successfully authenticated with the other terminal, the terminal and the other terminal respectively request the network side to establish a pairing relationship with the peer party, and the network side establishes a pairing relationship of the two terminals after the terminal is successfully paired with the other terminal. Wherein, the terminal carries an authentication password at the same time of sending the matching request to the other terminal which the terminal intends to be paired with, and if the other terminal agrees to establish a pairing relationship, it replies an authentication password to the terminal, and when the terminal matches the received authentication password with authentication password sent by itself and the matching is confirmed to be successful, the terminal and the other terminal to be paired therewith are successfully authenticated; after the terminal and the other terminal to be paired therewith are authenticated successfully, the terminal and the other terminal respectively report their pairing information and authentication passwords to the network side and request the network side to establish a pairing relationship with the peer party; the network side matches the matching information and the authentication passwords received from the two terminals in order, and establishes a matching relationship of the two terminals after all the matchings are successful while saving the matching information and the authentication passwords. Therefore, if the terminal initiates a call transfer request to the network side and carries the authentication password, after the network side searches out the other terminal which is paired with the terminal according to previously stored matching information, and matches the authentication password in the transfer request with the previously stored authentication password, and after determining that the matching is successful, it enables the call transfer function of the other terminal, and transfers all the calls of the other terminal to the terminal.

The embodiment of the present invention further provides a terminal, comprising: a pairing module and a call transfer module, wherein:

the pairing module is configured to: establish a pairing relationship with a second terminal via the network side;

the call transfer module is configured to: when enabling the call transfer function according to a demand of the second terminal paired therewith, initiate an enabling call transfer request to the network side, and according to the information, which is returned by the network side, of the second terminal paired with the terminal, enable the call transfer function of the second terminal, and transfer all calls of the second terminal to the terminal.

To sum up, the embodiment of the present invention provides a call transfer method and system, to enable the call transfer function as desired; and the paired terminal can transfer the transferred calls to each other, and the user can set and enable the function according to the actual situation; compared with the conventional call transfer function, the embodiment of the present invention has flexibility, and the function is remotely enabled after setting the paired terminal, which is not affected by situations such as whether currently the phone has a signal or not, or whether the phone is powered on or not, thus giving users great convenience, and the users can try this function under specific conditions, thus avoiding situations of missing important calls and text messages. Meanwhile, the embodiment of the present invention is equivalent to remotely enabling the call transfer function of a terminal, since the two terminals carry out the pairing process previously, the network side crossly stores information of the two terminals, therefore there is no problem of maliciously enabling the call transfer function of the other terminal or being transferred to a wrong terminal, so the embodiment of the present invention has great advantages in security and flexibility.

The above description is only preferred embodiments of the present invention, but the protection scope of the present document is not limited to this, any skilled in the art can easily think of changes or replacements within the technical scope disclosed in the present document, and these changes and replacements should fall within the protection scope of the present document. Accordingly, the protection scope of the present document should be subject to the protection scope of the claims.

INDUSTRIAL APPLICABILITY

Compared with the conventional call transfer function, the implementation of the abovementioned technical solution is more flexible, the call transfer function can be remotely enabled after setting the paired terminal, and it is not affected by situations such as whether currently the phone has a signal or not or whether the phone is powered on or not, which gives users great convenience and allows the users to use the function under specific conditions, thus avoiding situations of missing important calls and short messages, and so on. Therefore, it has very strong industrial applicability.

What is claimed is:

1. A call transfer setting method, comprising:
a first terminal and a second terminal pre-establishing a pairing relationship through a network side;
the first terminal initiating an enabling call transfer request to the network side;
the network side searching for the second terminal paired with the first terminal according to the enabling call transfer request of the first terminal, enabling a call transfer function of the second terminal according to the enabling call transfer request, and transferring all calls of the second terminal to the first terminal that initiated the enabling call transfer request.

2. The method of claim 1, wherein when the first terminal disables the call transfer according to a demand of the second terminal paired therewith, the first terminal initiates a disabling call transfer request to the network side; the network side disables the call transfer function of the second terminal according to the disabling call transfer request.

3. The method of claim 1, wherein the step of a first terminal and a second terminal pre-establishing a pairing relationship through a network side comprises:
after the first terminal initiates a matching request to the second terminal which the first terminal intends to be paired with and is successfully authenticated with the second terminal, the first terminal and the second terminal respectively requesting the network side to establish a pairing relationship with a peer party, after the network side successfully pairs the first terminal and the second terminal, the network side establishing the pairing relationship of the two terminals.

4. The method of claim 3, wherein the first terminal carries an authentication password at the same time of sending the matching request to the second terminal which the first terminal intends to be paired with, and if the second terminal agrees to establish a pairing relationship, the second terminal replies an authentication password to the first terminal, and when the first terminal matches the received authentication password with authentication password sent by the first terminal and the matching is confirmed to be successful, the first terminal is successfully authenticated with the first terminal which the first terminal intends to be paired with.

5. The method of claim 4, wherein after the first terminal is successfully authenticated with the second terminal which the first terminal intends to be paired with, the first terminal and the second terminal respectively report pairing information and authentication passwords of the first and second terminals to the network side, and request the network side to establish the pairing relationship with the peer party; the network side matches matching information and authentication passwords received from the two terminals in order, and establishes a matching relationship of the two terminals after all the matchings are successful while saving the matching information and the authentication passwords.

6. The method of claim 5, wherein if the first terminal carries the authentication password at the same time of initiating a call transfer request to the network side, after the network side searches out the second terminal which is paired with the first terminal according to previously stored matching information, the network side matches the authentication password in a transfer request with a previously stored authentication password, and after determining that the matching is successful, the network side enables the call transfer function of the second terminal and transfers all calls of the second terminal to the first terminal.

7. The method of claim 6, wherein the matching information comprises at least information of the second terminal which is paired with the first terminal.

8. The method of claim 1, wherein the first terminal and the second terminal pre-establish the pairing relationship through the network side in a wireless way.

9. A call transfer setting system, comprising a first terminal, a second terminal and a network side, the first terminal and the second terminal pre-establishing a pairing relationship through the network side, wherein:
the first terminal is configured to: initiate an enabling call transfer request to the network side;
the network side is configured to: search for the second terminal which is paired with the first terminal according to the enabling call transfer request of the first terminal, enable a call transfer function of the second terminal according to the enabling call transfer request, and transfer all calls of the second terminal to the first terminal that initiated the enabling call transfer request.

10. The system of claim 9, wherein the first terminal is further configured to: when disabling the call transfer according to the demand of the second terminal paired therewith, initiate a disabling call transfer request to the network side, and request the network side to disable the call transfer function of the second terminal.

11. A terminal, comprising: a pairing module and a call transfer module, wherein:
the pairing module is configured to: establish a pairing relationship with a second terminal via a network side;
the call transfer module is configured to: initiate an enabling call transfer request to the network side, and receive all calls for the second terminal through the network side.

12. The method of claim 2, wherein the step of a first terminal and a second terminal pre-establishing a pairing relationship through a network side comprises:
after the first terminal initiates a matching request to the second terminal which the first terminal intends to be paired with and is successfully authenticated with the second terminal, the first terminal and the second terminal respectively requesting the network side to establish a pairing relationship with a peer party, after the network side successfully pairs the first terminal and the second terminal, the network side establishing the pairing relationship of the two terminals.

13. The method of claim 12, wherein the first terminal carries an authentication password at the same time of sending the matching request to the second terminal which the first terminal intends to be paired with, and if the second terminal agrees to establish a pairing relationship, the second terminal replies an authentication password to the first terminal, and when the first terminal matches the received authentication password with authentication password sent by the first terminal and the matching is confirmed to be successful, the first terminal is successfully authenticated with the first terminal which the first terminal intends to be paired with.

14. The method of claim 13, wherein after the first terminal is successfully authenticated with the second terminal which the first terminal intends to be paired with, the first terminal and the second terminal respectively report pairing information and authentication passwords of the first and second terminals to the network side, and request the network side to establish the pairing relationship with the peer party; the network side matches matching information and authentication passwords received from the two terminals in order, and establishes a matching relationship of the two terminals after all the matchings are successful while saving the matching information and the authentication passwords.

15. The method of claim 14, wherein if the first terminal carries the authentication password at the same time of initiating a call transfer request to the network side, after the network side searches out the second terminal which is paired with the first terminal according to previously stored matching information, the network side matches the authentication password in a transfer request with a previously stored authentication password, and after determining that the matching is successful, the network side enables the call transfer function of the second terminal and transfers all calls of the second terminal to the first terminal.

16. The method of claim 15, wherein the matching information comprises at least information of the second terminal which is paired with the first terminal.

* * * * *